(12) United States Patent
Ishikawa et al.

(10) Patent No.: US 6,967,665 B2
(45) Date of Patent: Nov. 22, 2005

(54) PICTURE OUTPUTTING APPARATUS

(75) Inventors: Tadayuki Ishikawa, Tokyo (JP); Kazunori Yasuda, Kanagawa (JP); Yasuyuki Chaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 253 days.

(21) Appl. No.: 10/447,628

(22) Filed: May 28, 2003

(65) Prior Publication Data

US 2004/0032416 A1 Feb. 19, 2004

(30) Foreign Application Priority Data

May 29, 2002 (JP) .............................. 2002-156273

(51) Int. Cl.⁷ ............................................. G06T 11/00
(52) U.S. Cl. ..................................................... 345/629
(58) Field of Search ............................... 345/419, 420, 345/473, 474, 629

(56) References Cited

U.S. PATENT DOCUMENTS 6,567,091 B2 * 5/2003 Dye et al. ................... 345/501

OTHER PUBLICATIONS

Marrin et al., "Steerable Media: Interactive Television via Video Synthesis", Jan. 2001, ACM, pp. 7-15.*

* cited by examiner

*Primary Examiner*—Almis R. Jankus
(74) *Attorney, Agent, or Firm*—Frommer Lawrence & Haug LLP; William S. Frommer; Thomas F. Presson

(57) ABSTRACT

A picture outputting apparatus for producing a display picture by synthesis and outputting the synthesized picture to a display unit. The picture outputting apparatus includes a decoding unit 13 for decoding input encoded moving picture data, a data processing unit 18 for generating the first display area information for displaying a first display picture represented by the decoded moving picture data to an optional size in a specified location on the display unit, generating a second display picture of a picture format suited to the display unit based on the picture data contained in the input data, generating the second display area information for displaying the second display picture to an optional size in a specified location on the display unit, generating synthesizing parameters, determining the state of synthesis, in synthesizing a display picture, based on the first display area information and the second display area information, for adding the synthesizing parameter to the second display picture, and a synthesizing outputting unit for synthesizing the first and second display pictures, based on the synthesizing parameters, to output a display picture resulting from the synthesis to the display unit.

4 Claims, 7 Drawing Sheets

PICTURE OUTPUTTING APPARATUS

BACKGROUND OF THE INVENTION

1. Field of the Invention

This invention relates to a picture outputting apparatus for synthesizing a compressed moving picture and a background picture with a PC architecture as a basis. This application claims priority of Japanese Patent Application No. 2002-156273, filed on May 29, 2002, the entirety of which is incorporated by reference herein.

2. Description of Related Art

In a conventional video picture displaying apparatus, which is based on a personal computer (PC), an input compressed moving picture is decoded, using a video decoder board or a graphics accelerator, the so decoded moving picture and another picture are synthesized by a graphics outputting unit and a so synthesized picture is output on a display device as a display picture.

Referring to FIG. 6, the structure and the operation of the conventional apparatus for synthesizing pictures and outputting the resulting picture to a display device, are hereinafter explained. This apparatus is referred to below as a picture outputting apparatus 2.

The picture outputting apparatus 2, shown in FIG. 6, includes a data supply/storage unit 40, a data supply unit 41, a southbridge 42, an MPEG decoder 43, a northbridge 44, a RAM 45, a CPU 46, a graphics outputting unit 47, a RAM 48 and a RAM 49. The data supply/storage unit 40, connected to the southbridge 42, is a device for inputting/outputting data, including a compressed picture, such as a DVD drive, a HDD, a network module, a picture capture module or a tuner module. Meanwhile, plural data supply/storage units 40 may be connected to the southbridge 42. The data supply/storage unit 40 may also be connected to the southbridge 42 through an interface, such as IEEE 1394.

The data supply unit 41 is e.g., a tuner or an external input module, connected to the MPEG decoder 43 for directly transmitting a compressed picture to the MPEG decoder 43. The southbridge 42 is a bridge or a hub, such as ICH (I/O Controller Hub), to which are connected the northbridge 44 and the MPEG decoder 43. The southbridge 42 transforms data, supplied from the data supply/storage unit 40, into a predetermined signal format suited to the northbridge 44 and the MPEG decoder 43, and outputs the so transformed signals to the northbridge 44 and the MPEG decoder 43. The MPEG decoder 43 decodes the MPEG data supplied from the southbridge 42 or the data supply unit. The MPEG decoder 43 outputs the MPEG decoded data to the RAM 49. The RAM 49 memorizes the MPEG decoded data input from the MPEG decoder 43. The decoded MPEG data, stored in the RAM 49, is read out by a readout command from the CPU 46 and output to the southbridge 42.

The northbridge 44 is a bridge or a hub, such as MCH (Memory Controller Hub), connected to the RAM 45, CPU 46 and to the graphics outputting unit 47. The northbridge 44 transforms the MPEG data, decoded MPEG data or the graphics data, supplied from the southbridge 42, into a predetermined signal format suited to the equipment, to which the northbridge is connected, to output the so transformed data. The CPU 46 operates as a main processing unit for the picture outputting apparatus 2 for reading out data stored in the RAM 45, performing predetermined processing on the read-out data and for outputting the processed results through the northbridge 44 to the graphics outputting unit 47.

The graphics outputting unit 47 transforms the data, input through the northbridge 44, into a picture format suited to the display unit, to output the resulting data to the display unit. Meanwhile, a picture generated based on the decoded MPEG data is displayed on an area coated all-over with a key color by a chroma key for display on a predetermined site on the display unit.

In the above-described conventional picture outputting apparatus 2, the MPEG data needs to be decoded by the MPEG decoder 43 and subsequently routed over a connection line, such as PCI bus, through the southbridge 42 and the northbridge 44 to the graphics outputting unit 47, in order to transform the decoded MPEG data into a display picture and in order to output the resulting picture to the display unit.

Thus, if the decoded MPEG data is the large capacity data of the HDTV (High Definition Television) class, there is raised a problem that the bus between the MPEG decoder 43 and the southbridge 42 suffers from shortage in the frequency band.

If, in order to overcome this problem, part of the decoding processing for MPEG data, supplied from the data supply unit 41, is performed by the CPU 46, partly processed MPEG data is supplied to the graphics outputting unit 50 having a calculating unit for supporting the MPEG decoding and the remaining decoding is performed by the graphics outputting unit 50, as shown in FIG. 7, the load imposed on the CPU 46 is increased as a result of the CPU 46 taking over a part of the decoding processing. In addition, the frequency band of the bus between the northbridge 47 and the graphics outputting unit 47 tends to be wastefully consumed when the partially processed MPEG data is supplied from the northbridge 44 to the graphics outputting unit 50.

Moreover, when a first display picture represented by the decoded MPEG data is demonstrated on a display unit, this first display picture is demonstrated in an area coated all-over with the predetermined key color, so that, if the second display picture, represented by the picture data other than the MPEG data, is superposed on the first display picture, there is raised a problem that, in an area where the key color is the same as the color used in the second display picture, the background side first display image is displayed on the foreground, as shown in FIG. 5A.

SUMMARY OF THE INVENTION

It is therefore an object of the present invention to provide a picture outputting apparatus in which the load imposed on the bus between the MPEG decoder and the southbridge and between the northbridge and the graphics output unit is relieved and in which a first displayed picture on the background side and a second displayed picture on the foreground side may be synthesized without producing a phenomenon in which the first displayed picture on the background side is displayed on the second displayed picture on the foreground side in an overlapping area of the first and second displayed pictures.

According to the present invention, there is provided a picture outputting apparatus for outputting a display picture to a display unit, comprising decoding means for decoding input encoded moving picture data, data processing means including a first display area information generating unit for generating the first display area information for displaying a first display picture represented by the decoded moving picture data to an optional size in a specified location on the display unit, a storage unit for transiently storing the input data, a display picture generating unit for generating a second display picture of a picture format suited to the display unit based on the picture data contained in the data, a second display area information generating unit for generating the second display area information for displaying a second display picture to an optional size in a specified location on the display unit, a synthesizing parameter generating unit for generating synthesizing parameters, determining the state of synthesis, based on the first display area information and the second display area information, at the time of synthesizing said first and second display pictures, and a synthesizing parameter addition unit for adding the synthesizing parameters to the second display picture, and synthesizing outputting means for synthesizing the first and second display pictures, based on the synthesizing parameters, to output a display picture resulting from the synthesis to the display unit.

With the picture outputting apparatus, described above in detail, data processing means and synthesizing outputting means are interconnected by a connection line, a first display picture, generated by the display picture generating means, is supplied to the synthesizing outputting means, and a second display picture, generated in the data processing means, and provided with the synthesizing parameters, is sent through the connection line to the synthesizing outputting means, where the first and second display pictures are synthesized, based on the synthesizing parameters, and the resulting synthesized display picture is output to a display unit. Since the first display picture of a large capacity is not moved, as the load is imposed on a connection line other than the above-mentioned connection line in the picture outputting apparatus, the load imposed on the connection line may be relieved. Since the first and second display pictures are synthesized together based on the synthesizing parameters, the synthesized display picture may be obtained without producing the phenomenon of demonstrating the first display picture on the background side on the second display picture on the foreground side in an overlapping picture portion of the first and second display pictures.

DESCRIPTION OF THE PREFERRED EMBODIMENTS

Figure 1:
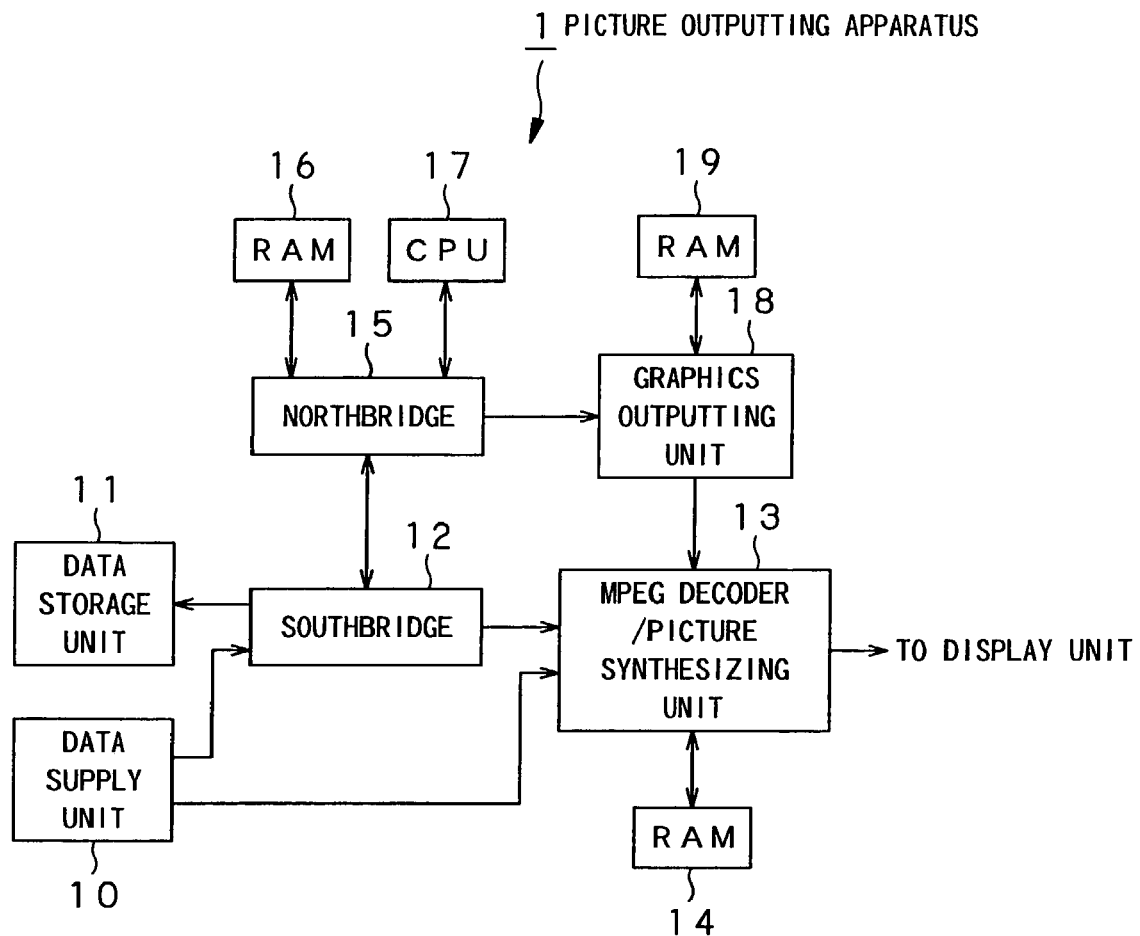
FIG. 1 is a block diagram showing the structure of a picture outputting apparatus embodying the present invention.

Referring to the drawings, preferred embodiments of the present invention will be explained in detail.

The present invention is applied to a picture outputting apparatus 1 shown for example in FIG. 1. The picture outputting apparatus 1, adapted for outputting a display picture to a display unit, includes a data supply unit 10, a data storage unit 11, a southbridge 12, an MPEG decoder/picture synthesizing unit 13, a RAM 14, a northbridge 15, a RAM 16, a CPU 17, a graphics outputting unit 18 and a RAM 19. In this picture outputting apparatus 1, the MPEG decoder/picture synthesizing unit 13 decodes MPEG data, supplied from the data supply unit 10, and the CPU 17 generates the first display area information for displaying the first display picture represented by the as-decoded MPEG data (referred to below as decoded MPEG data) to an optional size in a specified location on the display unit. The RAM 16 transiently stores data, including the graphics data, and the graphics outputting unit 18 generates a second display area of a picture form conforming to the display unit, based on the graphics data read out from the RAM 16. The CPU 17 generates the second display area information for displaying the second display picture to an optional size in a specified location of the display unit, while generating, in synthesizing the first and second display pictures, synthesizing parameters determining the state of synthesis based on the first display picture information and the second display picture information. The synthesizing parameters are referred to below as the alpha-plane information. The graphics outputting unit 18 adds the alpha-plane information to the second display picture. Moreover, in the picture outputting apparatus 1, the graphics outputting unit 18 is connected to the MPEG decoder/picture synthesizing unit 13 over a connection line, so that the second display picture with the alpha-plane information is supplied from the graphics outputting unit 18 through the connection line to the MPEG decoder/picture synthesizing unit 13. In this MPEG decoder/picture synthesizing unit 13, the first and second display pictures are synthesized in the MPEG decoder/picture synthesizing unit 13, based on the alpha-plane information, and the resulting picture is output to the display unit.

The structure and the operation of the picture outputting apparatus 1 are hereinafter explained. The data supply unit 10, which is a device for inputting/outputting data including compressed pictures, such as a DVD drive, a network module, a picture capture module or a tuner module, is connected to the southbridge 12 and to the MPEG decoder/picture synthesizing unit 13. The data supply unit 10 may supply e.g., MPEG data through the southbridge 12 to the MPEG decoder/picture synthesizing unit 13 and to the northbridge 15, or directly supply MPEG data to the MPEG decoder/picture synthesizing unit 13. Meanwhile, plural data supply units 10 may be connected to the southbridge 12, or the data supply unit 10 may be connected to the southbridge 12 through an interface, such as IEEE 1394.

The data storage unit 11 is e.g., a HDD or a DVD recorder and is connected to the southbridge 12. The data storage unit 11 records MPEG data through the southbridge 12. This southbridge 12 is a bridge or a hub, such as ICH (I/O controller hub), and is connected to the data storage unit 11, data supply unit 10, northbridge 15 and to the MPEG decoder/picture synthesizing unit 13. The southbridge 12 transforms the graphics data and the MPEG data, supplied from the data supply unit 10, into a predetermined signal format, and routes the resulting data to the northbridge 15 and to the MPEG decoder/picture synthesizing unit 13.

The MPEG decoder/picture synthesizing unit 13 is e.g., a DSP connected to the data supply unit 10, southbridge 12, RAM 14 and to the graphics outputting unit 18, and decodes MPEG data supplied from the data supply unit 10 or the MPEG data supplied from the southbridge 12. The MPEG decoder/picture synthesizing unit 13 also synthesizes the first and second display pictures, represented by the MPEG decoded data, based on the alpha-plane information, supplied from the graphics outputting unit 18 along with the second display information, to output the synthesized display picture to the display unit. The MPEG decoder/picture synthesizing unit 13 also outputs the decoded MPEG data and the synthesized display picture to the RAM 14. The first and second display pictures, demonstrated on the display unit, are demonstrated to an optional size in a specified location based on the display information generated in the CPU 17.

The RAM 14 is e.g., a DRAM for storage of the MPEG data decoded in the MPEG decoder/picture synthesizing unit 13 and the synthesized picture. The synthesized picture, stored in the RAM 14, is output to and demonstrated in the display unit. Meanwhile, the RAM 14 may also be an SDRAM if it is able to store and hold data to be used by the MPEG decoder/picture synthesizing unit 13.

The northbridge 15 is e.g., a bridge or a hub, such as MCH (Memory Controller Hub), connected to the southbridge 12, RAM 16, CPU 17 and to the graphics outputting unit 18. The northbridge 15 transforms graphics data and MPEG data, supplied from the southbridge 12, to a predetermined signal format, and routes the resulting data to the RAM 16 and to the CPU 17. The RAM 16 is e.g., an SDRAM, connected to the northbridge 15, and operates as a main memory of the picture outputting apparatus 1 to store and hold various data used in the picture outputting apparatus 1. Meanwhile, the RAM 16 may be an RDRAM if it is a module usable as a main memory of the picture outputting apparatus 1. The CPU 17 is connected to the northbridge 15 and operates as a main processing unit of the picture outputting apparatus 1 for reading out data stored in the RAM 16, processing the read-out data in a predetermined manner and for outputting the processed results to e.g., the graphics outputting unit 18. The CPU 17 also generates the alpha-plane information, used in producing the display picture on synthesis in the graphics outputting unit 18, to output the so generated alpha-plane information to the graphics outputting unit 18. The method for generating the alpha-plane information will be explained subsequently.

The graphics outputting unit 18 is e.g., a graphics accelerator and is connected to the northbridge 15, RAM 19 and to the MPEG decoder/picture synthesizing unit 13. The graphics outputting unit 18 generates, based on the graphics data, supplied via the northbridge 15, a display picture of a predetermined picture format, and mixes the generated displayed picture and the alpha-plane information together, to send the displayed picture along with the alpha-plane information to the MPEG decoder/picture synthesizing unit 13. The graphics outputting unit 18 exploits the RAM 19 for processing and holding the display picture provided with the alpha-plane information. Meanwhile, the graphics outputting unit 18 may be a device other than the graphics accelerator, provided that it is able to generate a display picture of the predetermined picture format, based on the graphics data, to mix the generated display picture and the alpha-plane information and to output the resulting mixed data to the MPEG decoder/picture synthesizing unit 13.

The RAM 19 is e.g., a DDR, connected to the graphics outputting unit 18, for storage of data used in the graphics outputting unit 18. Meanwhile, the RAM 19 may e.g., be an SDRAM, or the RAM 16 may be used as a substitute, provided that it is able to store and hold data used by the graphics outputting unit 18. In the latter case of using the RAM 16, the cost for the RAM 19 may be saved to lower the cost of the entire apparatus.

The picture synthesizing operation of the MPEG decoder/picture synthesizing unit 13 is now explained. The MPEG decoder/picture synthesizing unit 13 decodes the MPEG data, supplied from the southbridge 12 or the data supply unit 10, to generate decoded MPEG data, to generate a first display picture, as a picture format suited to the display unit, based on the decoded MPEG data. On the other hand, the graphics outputting unit 18 is supplied from the northbridge 15 with graphic data and, based on the graphic data, generates a second display data which is of the picture format suited to the display unit. The CPU 17 generates the display area information for demonstrating the first display picture represented by the decoded MPEG data and the second display picture represented by the graphics data to an optional size in a specified location of the display unit, and routes the generated display area information to the MPEG decoder/picture synthesizing unit 13. The CPU 17 also generates one picture equivalent of the alpha-plane information, having a predetermined gradation value, to route the alpha-plane information to the graphics outputting unit 18. This graphics outputting unit 18 synthesizes the alpha-plane information with the second display picture to route the second display picture provided with the alpha-plane information to the MPEG decoder/picture synthesizing unit 13.

Based on the alpha-plane information, the MPEG decoder/picture synthesizing unit 13 synthesizes the first display picture and the second display picture to output the synthesized display picture to the display unit depending on the display area information.

The alpha-plane information, explained here, is the information ancillary to the second display information. If, in the alpha-plane information, ancillary to the second display picture, the degree of transparency is [α], the color information [C] demonstrated on the display area may be expressed by $$C = C1 \times (1-\alpha) + C2 \times \alpha$$

where C1 is the color information of the first display picture and C2 is the color information of the second display picture. Meanwhile, α is such that $0 \leq \alpha \leq 1$, so that, if α=0 or α=1, as an example, the pixel portion in the picture to which the alpha-plane information is ancillary (second display picture) with α=0 or the pixel portion in the picture to which the alpha-plane information is ancillary (second display picture) with α=1 are assumed to be completely transparent or completely opaque, respectively.

Figure 2A:
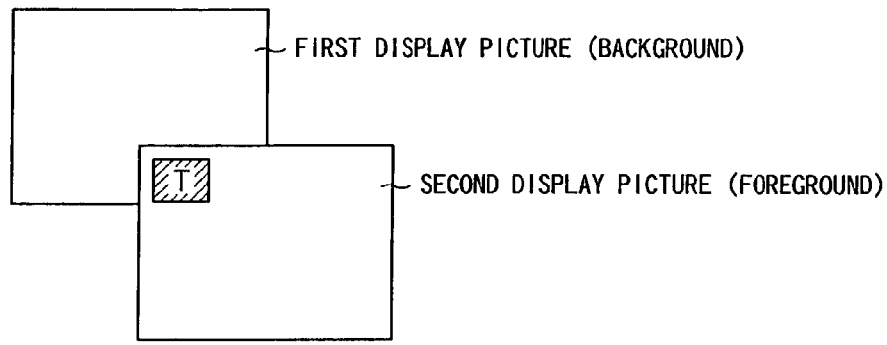
FIG. 2A is a schematic view showing first and second display pictures being synthesized together.

In the above equation, the color information [C] is used for simplifying the equation. In actuality, however, the pixel information, such as R, G and B, luminance or chroma, is used. On the other hand, the alpha-plane information may be conceived independently of the foreground/background (Z-axis direction) relationship on the three-dimensional coordinates of the picture, such that, if the alpha-plane information of the area indicated by [T] in FIG. 2A is [α]=0 (transparent), the first display picture as the background information is synthesized and output in the area [T] in FIG.

2A. For achieving a more advanced picture display, the first display picture also may be provided with the alpha-plane information.

Figure 2B:
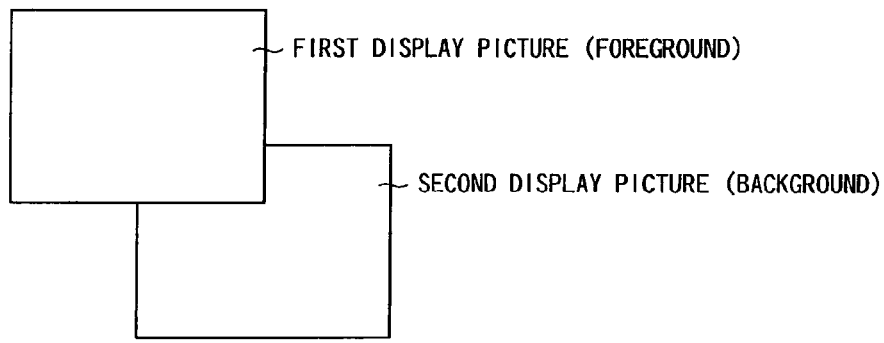
FIG. 2B is a schematic view showing a synthesized picture in which the first display picture is the foreground display picture and the second display picture is the background display picture and FIG. 2C is a schematic view showing a synthesized picture in which the second display picture is the foreground display picture and the first display picture is the background display picture
Figure 2C:
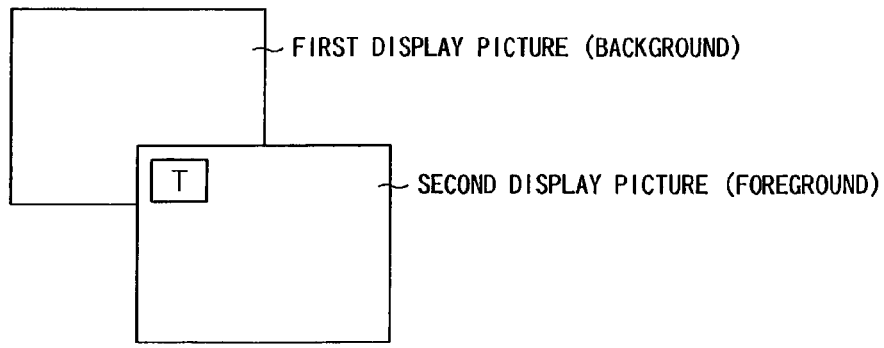

The actual foreground/background relationship of a picture may be afforded independently of the alpha plane information, as discussed above. Since the manner in which a two-dimensional picture demonstrated on a display unit is changed with the alpha plane information, the picture portion which apparently is the foreground is expressed as the [foreground]. If, in a picture portion where the first and second display pictures overlap each other, the picture portion demonstrated on the picture ultimately demonstrated on the display unit is defined as being the [foreground], the first display picture area of the alpha plane information is adjusted to [transparent] in case the first display picture is the foreground and the second display picture is the background, as shown in FIG. 2B. If, in the above case, the second display picture is the foreground and the first display picture is the background, as shown in FIG. 2C, the first display picture area of the alpha plane information is adjusted to [opaque]. In this manner, the first display picture as the background information may be output without being synthesized in the area [T].

Figure 3:
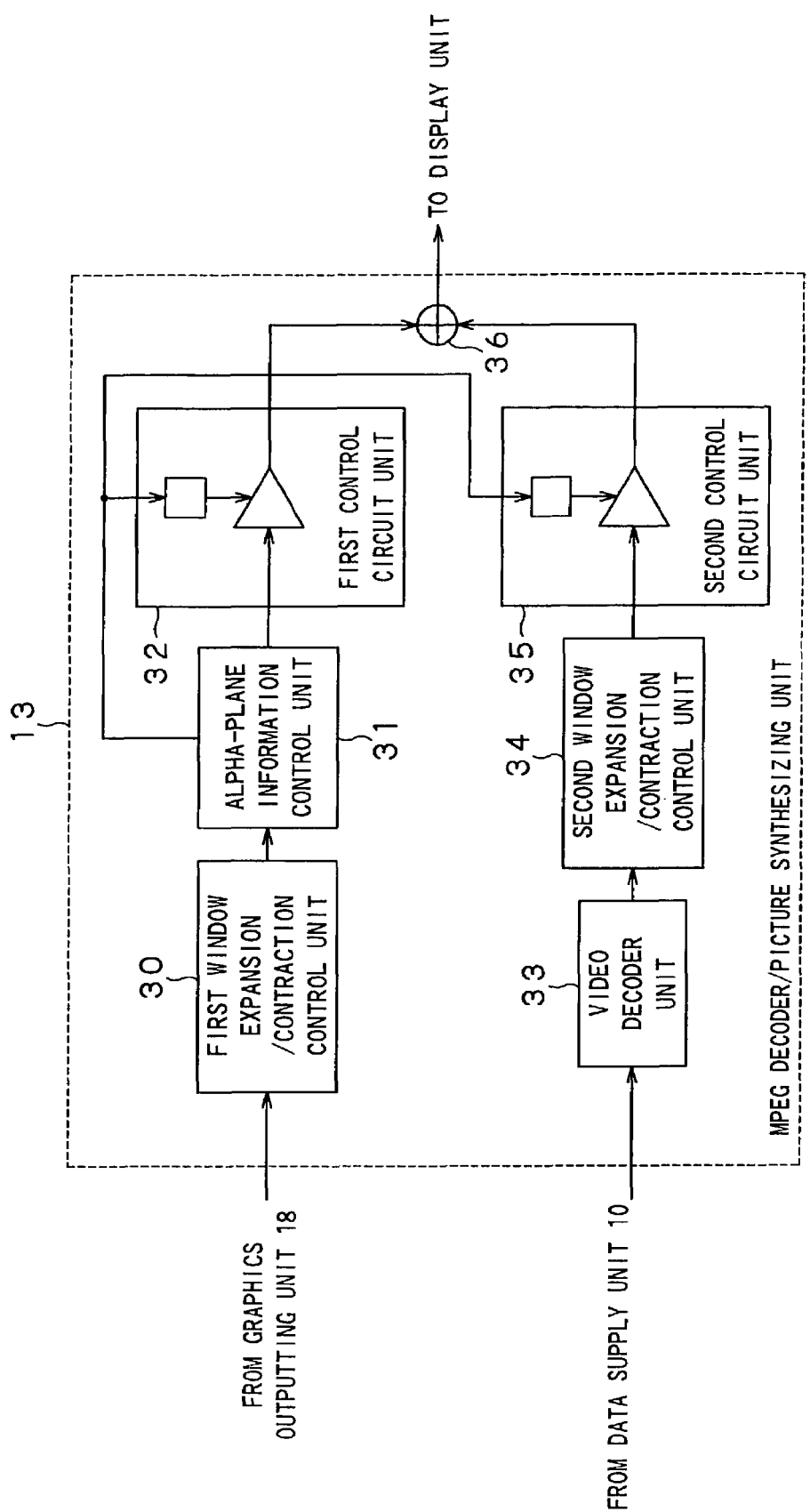
FIG. 3 is a block diagram showing the structure of an MPEG decoder/picture synthesizing unit provided to a picture outputting device embodying the present invention.

The MPEG decoder/picture synthesizing unit 13 may be provided with a first window expansion/contraction control unit 30, an alpha-plane information control unit 31, a first control circuit unit 32, a video decoder unit 33, a second window expansion/contraction control unit 34, a second control circuit 35 and a display picture synthesis unit 36, as shown for example in FIG. 3.

The second display picture, provided with the alpha-plane information, is input to the first window expansion/contraction control unit 30. The first window expansion/contraction control unit 30 controls the size and the position of the second display picture, demonstrated on the display unit, and outputs the so controlled second display picture to the alpha-plane information control unit 31. The alpha-plane information control unit 31 extracts the alpha-plane information from the second display picture. The extracted alpha-plane information is supplied to the first control circuit unit 32 and to the second control circuit 35. The first control circuit unit 32 controls the second display picture in a predetermined manner to output the so controlled second display picture to the display picture synthesis unit 36.

The video decoder unit 33 decodes the input MPEG data to generate the first display picture to output the first display picture to the second window expansion/contraction control unit 34. This second window expansion/contraction control unit 34 controls the size and the position of the first display picture as it is demonstrated on the display unit to output the as-controlled first display picture to the second control circuit 35. This second control circuit 35 controls the first display picture in a predetermined manner to output the controlled first display picture to the display picture synthesis unit 36. This display picture synthesis unit 36 synthesizes the first and second display pictures to output the so synthesized display picture to the display unit.

Since there is provided the window expansion/contraction control unit 34 for processing the first and second display pictures, as described above, the area size of the first display area or the area size of the second display area need not be coincident with the area size used ultimately for display in the display unit.

On the other hand, the first control circuit unit 32 controls the second display picture from the second display picture and from the coefficient [α] as the alpha-plane information ancillary to the second display picture, while the second control circuit 35 controls the first display picture by the first display picture and the coefficient [1−α].

Figure 4:
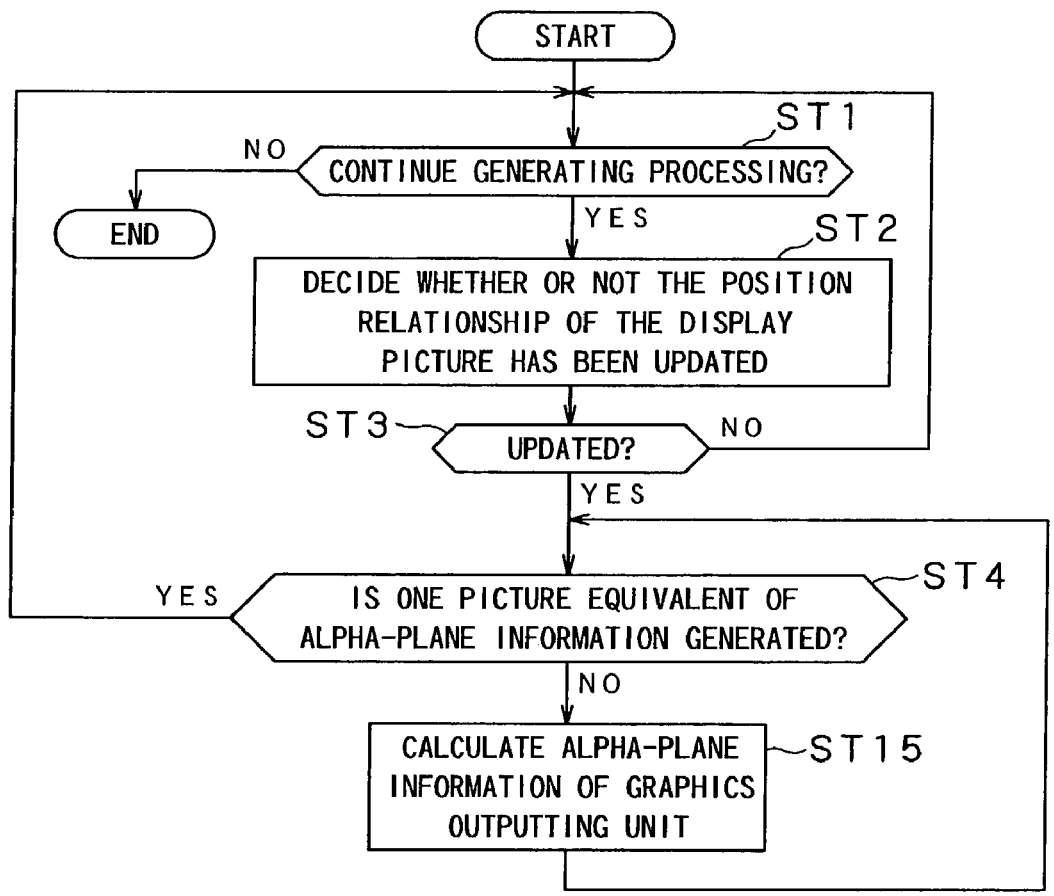
FIG. 4 is a flowchart for illustrating the operation of generating the alpha-plane information by a CPU provided to the picture output apparatus embodying the present invention.

The generation of the alpha-plane information is explained using a flowchart shown in FIG. 4.

In a step ST1, the CPU 17 checks whether or not the processing of generating the alpha-plane information is to be continued. If the MPEG decoder/picture synthesizing unit 13 does not output the synthesized picture to the display unit, the CPU 17 terminates the processing of generating the alpha-plane information. If the MPEG decoder/picture synthesizing unit 13 continues to output the synthesized picture to the display unit, the CPU 17 proceeds to a step ST2.

In this step ST2, the CPU 17 checks whether or not the position relationship such as the foreground/background order of the first and second display pictures has been updated after the previous processing.

If, by the check in the step ST2, the position relationship such as the foreground/background order of the first and second display pictures has not been changed, that is not updated, from the state of the previous processing, the CPU 17 in a step ST3 reverts to the step ST1. If the position relationship such as the foreground/background order of the first and second display pictures has been changed, that is updated, from the state of the previous processing, the CPU 17 proceeds to a step ST4. Meanwhile, if the processing is initiated for the first time, the CPU proceeds to a step ST4. By carrying out the processing of steps ST2 and ST3, the quantity of data processed by the CPU 17 and the load may be decreased in case the respective areas have not been moved.

In the step ST4, the CPU 17 verifies whether or not the alpha-plane information for the output one picture has been generated. If it is verified that the one picture equivalent of the alpha-plane information has been generated, the CPU reverts to the step ST1. If it is verified that the one picture equivalent of the alpha-plane information has not been generated, the CPU proceeds to the step ST5 in order to continue the generation of the alpha-plane information for pixels not as yet processed. In the step ST5, the CPU 17 calculates the foreground/background order of the first and second display pictures. By the foreground/background is here meant not the three-dimensional position relationship of the first and second pictures, but how these pictures appear on the display unit. If, in connection with the pixel, currently checked, the picture obtained in the MPEG decoder/picture synthesizing unit 13 shown in FIG. 1 is displayed on the display unit, the value of the alpha-plane information of the pixel being processed is adjusted to a gradation value 0 (transparent). If it is desired to display the picture, obtained in the MPEG decoder/picture synthesizing unit 13, on the display unit, the value of the alpha-plane information is adjusted to a gradation value 255 (opaque). Meanwhile, in the present embodiment, the alpha-plane information is of the 256 gradation values of from 0 (transparent) to 255 (opaque), in which any intermediate value may be taken depending on the degree of transparency desired to be displayed. After the end of this processing, the CPU reverts to the step ST4.

By performing the above processing, the alpha-plane information may be generated. The MPEG decoder/picture synthesizing unit 13 synthesizes the first and second display pictures, based on the above gradation values of the alpha-plane information, to output the synthesized picture to the display unit.

Thus, the graphics outputting unit 18, provided to the picture outputting apparatus 1 according to the present invention, processes graphics data other than the MPEG data, various commands for displaying the second display picture represented by the graphics data on the display unit, or the aforementioned alpha-plane information, to generate the display picture provided with the alpha-plane information to the MPEG decoder/picture synthesizing unit 13. In the conventional picture outputting apparatus, the graphics outputting unit 18 and the display unit are interconnected by a connection line, and the display picture is output from the graphics outputting unit 18 to the display unit through the connection line. According to the present invention, the graphics outputting unit 18 and the MPEG decoder/picture synthesizing unit 13 are interconnected by a connection line, and the display picture provided with the alpha-plane information is supplied from the graphics outputting unit 18 to the MPEG decoder/picture synthesizing unit 13 through ths connection line to output the display picture from the MPEG decoder/picture synthesizing unit 13 to the display unit.

Figure 5:
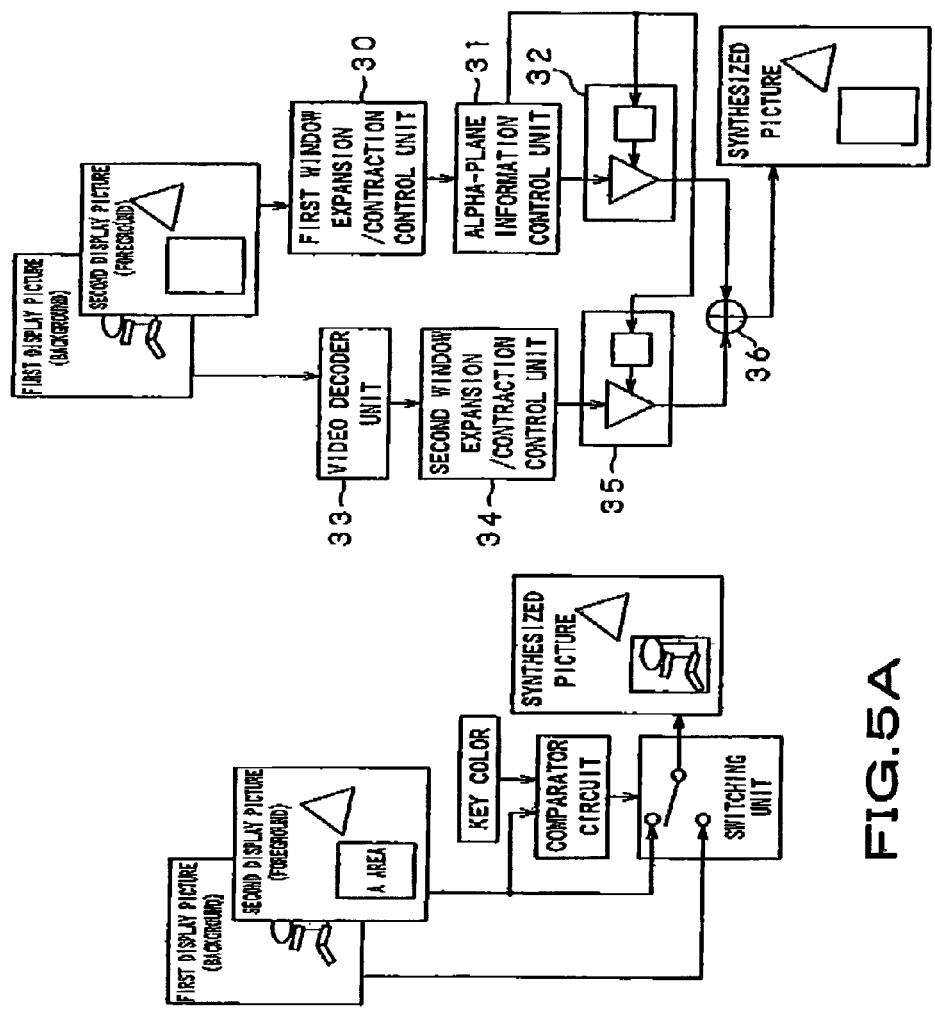
FIG. 5A shows the synthesizing processing by a conventional picture outputting apparatus and FIG. 5B shows, for comparison, the synthesizing processing by an inventive picture outputting apparatus.
Figure 6:
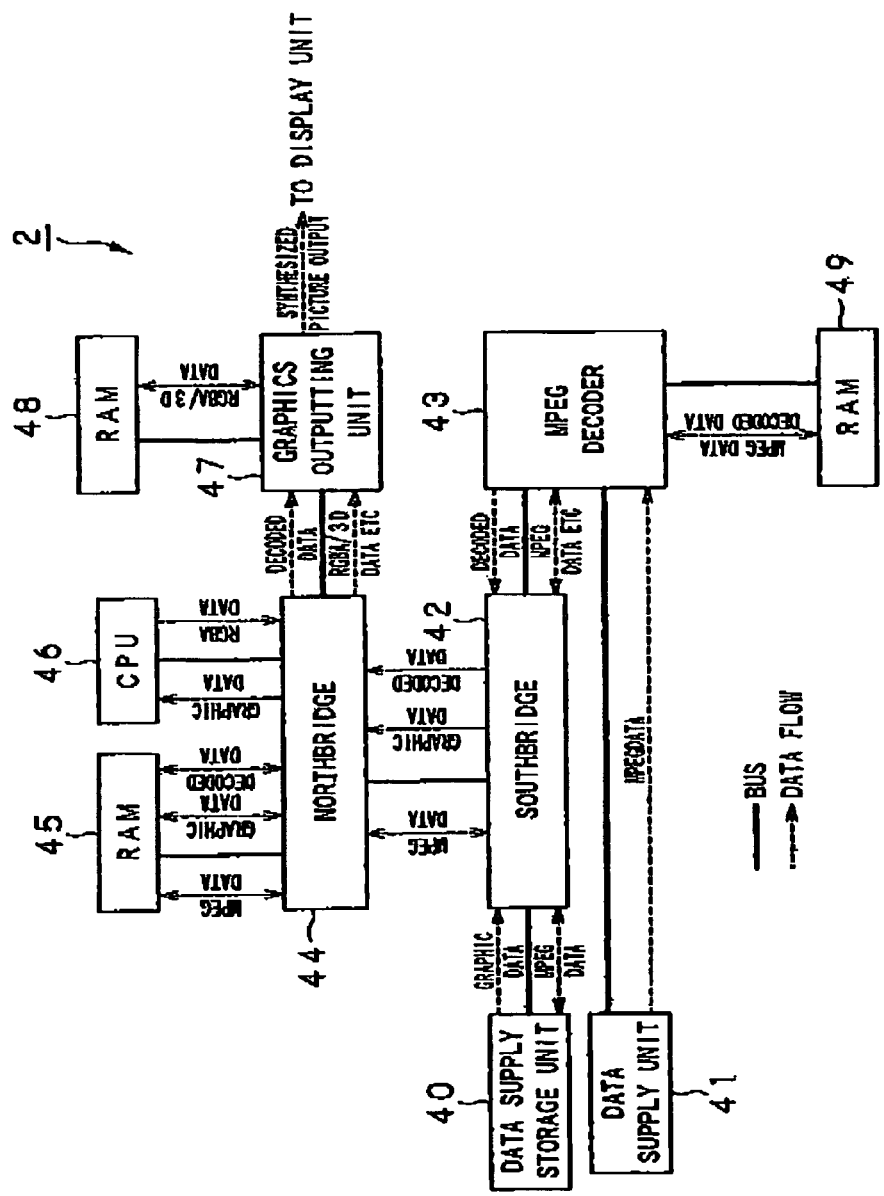
FIG. 6 is a block diagram showing a first illustrative structure of a conventional picture outputting apparatus.
Figure 7:
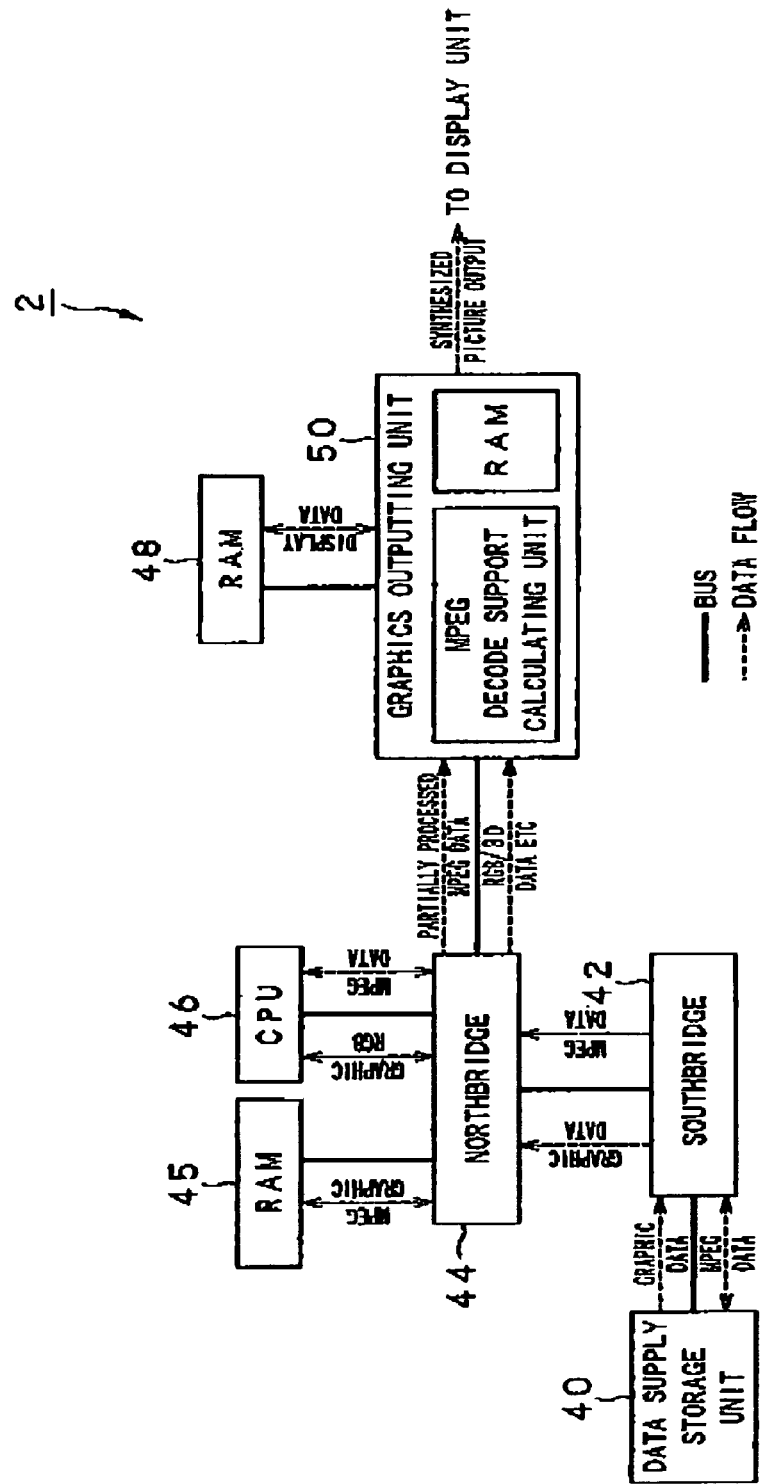
FIG. 7 is a block diagram showing a second illustrative structure of a conventional picture outputting apparatus.

The processing of synthesizing the display picture by the conventional picture outputting apparatus and that by the inventive picture outputting apparatus 1 are compared to each other using FIG. 5. If, in the conventional picture outputting apparatus, the first display picture is on the background side and the second display picture is the foreground side, as shown in FIG. 5A, the comparator circuit gives the difference between the color used for the second display picture and the key color, when synthesizing the first and second pictures, with the result that the first display picture is demonstrated in the area A of the second display picture if the key color of the first display picture is the same as the color used in the area A of the second display area. In the picture outputting apparatus of the present invention, the apparatus is of the structure shown in FIG. 3, as shown in FIG. 5B, so that there is no possibility of the first display picture as the background being demonstrated on the second display picture as the foreground, as shown in FIG. 5B.

In the picture outputting apparatus 1, the graphics outputting unit 18 and the MPEG decoder are interconnected over a bus, the second display picture provided with the alpha-plane information, represented by the graphics data, is routed from the graphics outputting unit 18 to the MPEG decoder/picture synthesizing unit 13, the first and second display picture represented by the decoded MPEG data are synthesized by the MPEG decoder/picture synthesizing unit 13 based on the alpha-plane information, and the so synthesized display picture is output to the display unit, thus relieving the load imposed on the connection lines between the MPEG decoder and the southbridge 12 and between the northbridge 15 and the graphics outputting unit 18 in the overlapping picture portions of the first and second display pictures. Moreover, the display pictures may be synthesized in the overlapping portions of the first and second display pictures without producing a phenomenon in which the first display picture as the background picture is displayed on the second display picture as the foreground picture. Moreover, with the picture outputting apparatus 1, the processing of decoding the MPEG data is carried out only by the MPEG decoder/picture synthesizing unit 13, thus relieving the load imposed on the CPU 17.

With the picture outputting apparatus 1 of the present invention, a variety of control signals, including programs and data handled by the programs, in addition to the graphics data and the MPEG data, are transmitted/received between the respective equipment over connection lines. The aforementioned first and second display pictures are output to the display unit in color representation systems, e.g., as RGB or YUV signals. Moreover, the picture outputting apparatus 1 according to the present invention may be applied to for example a personal computer (PC), a portable information terminal, a personal video recorder (PVR) os a set top box (STB).

While the invention has been described in accordance with certain present embodiments thereof illustrated in the accompanying drawings and described in the above description in detail, it should be understood by those ordinarily skilled in the art that the invention is not limited to the embodiments, but various modifications, alternative constructions or equivalents can be implemented without departing from the scope and the spirit of the present invention as set forth and defined in the appended claims.

What is claimed is:

1. A picture outputting apparatus for outputting a display picture to a display unit, comprising:
   decoding means for decoding input encoded moving picture data;
   data processing means including;
   a first display area information generating unit for generating the first display area information for displaying a first display picture, represented by the decoded moving picture data, to an optional size in a specified location on said display unit,
   a storage unit for transiently storing the input data, a display picture generating unit for generating a second display picture of a picture format suited to said display unit based on the picture data contained in said data,
   a second display area information generating unit for generating the second display area information for displaying a second display picture to an optional size in a specified location on said display unit,
   a synthesizing parameter generating unit for generating synthesizing parameters, determining positional relationship of said first display picture and said second display picture in an overlapping picture portion of said first display picture and said second display picture, based on said first display area information and said second display area information, at the time of synthesizing said first and second display pictures, and
   a synthesizing parameter addition unit for adding said synthesizing parameters to said second display picture; and
   synthesizing outputting means for synthesizing said first and second display pictures, based on said synthesizing parameters, to output a display picture resulting from the synthesis to said display unit.

2. The picture outputting apparatus according to claim 1 wherein said data processing means adjusts said synthesizing parameters to transparent or opaque if said first display picture is the foreground picture and the second display picture is the background picture or if said second display picture is the foreground picture and the first display picture is the background picture, respectively.

3. The picture outputting apparatus according to claim 1 wherein said encoded moving picture data is the MPEG encoded data.

4. The picture outputting apparatus according to claim 1, wherein said data processing means determines the foreground/background order of said first and second display picture in an overlapping picture portion of said first and second display pictures by adjusting said synthesizing parameters.

* * * * *